US006955796B2

(12) United States Patent
Saran et al.

(10) Patent No.: US 6,955,796 B2
(45) Date of Patent: Oct. 18, 2005

(54) PROCESS FOR TOTAL ENVIRONMENTAL REMEDIATION OF A PHOSPHORUS CONTAMINATED SITE

(75) Inventors: Mohan Singh Saran, Grand Island, NY (US); George Walter Luxbacher, Georgetown, KY (US)

(73) Assignee: Glenn Springs Holdings Company, Lexington, KY (US)

( * ) Notice: Subject to any disclaimer, the term of this patent is extended or adjusted under 35 U.S.C. 154(b) by 325 days.

(21) Appl. No.: 10/249,995

(22) Filed: May 27, 2003

(65) Prior Publication Data

US 2004/0241073 A1 Dec. 2, 2004

(51) Int. Cl.⁷ ............................................. C01B 25/04
(52) U.S. Cl. ....................... 423/322; 210/710; 210/908
(58) Field of Search ........................ 423/322; 210/710, 210/906

(56) References Cited

U.S. PATENT DOCUMENTS

| | | | | |
|---|---|---|---|---|
| 3,442,621 A | * | 5/1969 | Hinkebein | 423/322 |
| 4,192,853 A | * | 3/1980 | Chernogorenko et al. | 423/122 |
| 4,686,094 A | * | 8/1987 | Roberts et al. | 588/320 |
| 5,002,745 A | * | 3/1991 | Michaels et al. | 423/322 |
| 6,446,812 B1 | * | 9/2002 | Sturdivant et al. | 209/238 |
| 6,451,276 B1 | * | 9/2002 | Saran et al. | 423/322 |
| 6,620,396 B2 | * | 9/2003 | Saran | 423/322 |

* cited by examiner

Primary Examiner—Wayne A. Langel
(74) Attorney, Agent, or Firm—Richard D. Fuerle

(57) ABSTRACT

A process is disclosed for recovering elemental phosphorus from an aqueous sludge and converting the residue into non-hazardous waste. The sludge is separated into (1) a slurry of water containing suspended phosphorus and dirt particles and (2) coarse solids. A flocculating agent is added to the slurry to agglomerate the suspended phosphorus and dirt particles, which are recovered from the water and are heated to melt elemental phosphorus particles. A coalescing agent is added to coalesce the melted elemental phosphorus, which is separated from the dirt particles. The coarse solids are mixed with hot water to melt the phosphorus sludge, which is separated from inert solids. The solids are heated to burn any residual elemental phosphorus. The separated molten phosphorus sludge is stirred with a solution of chromic acid to recover the phosphorus as a separate phase. A reducing agent is added to the remaining water and solids to reduce the $Cr^{+6}$ to $Cr^{+3}$. Finally, an alkali is added to the water and solids to react the residual phosphorus and form phosphorous compounds. The reaction mass is filtered and the filter cake can be placed in a landfill as a non-hazardous waste.

20 Claims, 1 Drawing Sheet

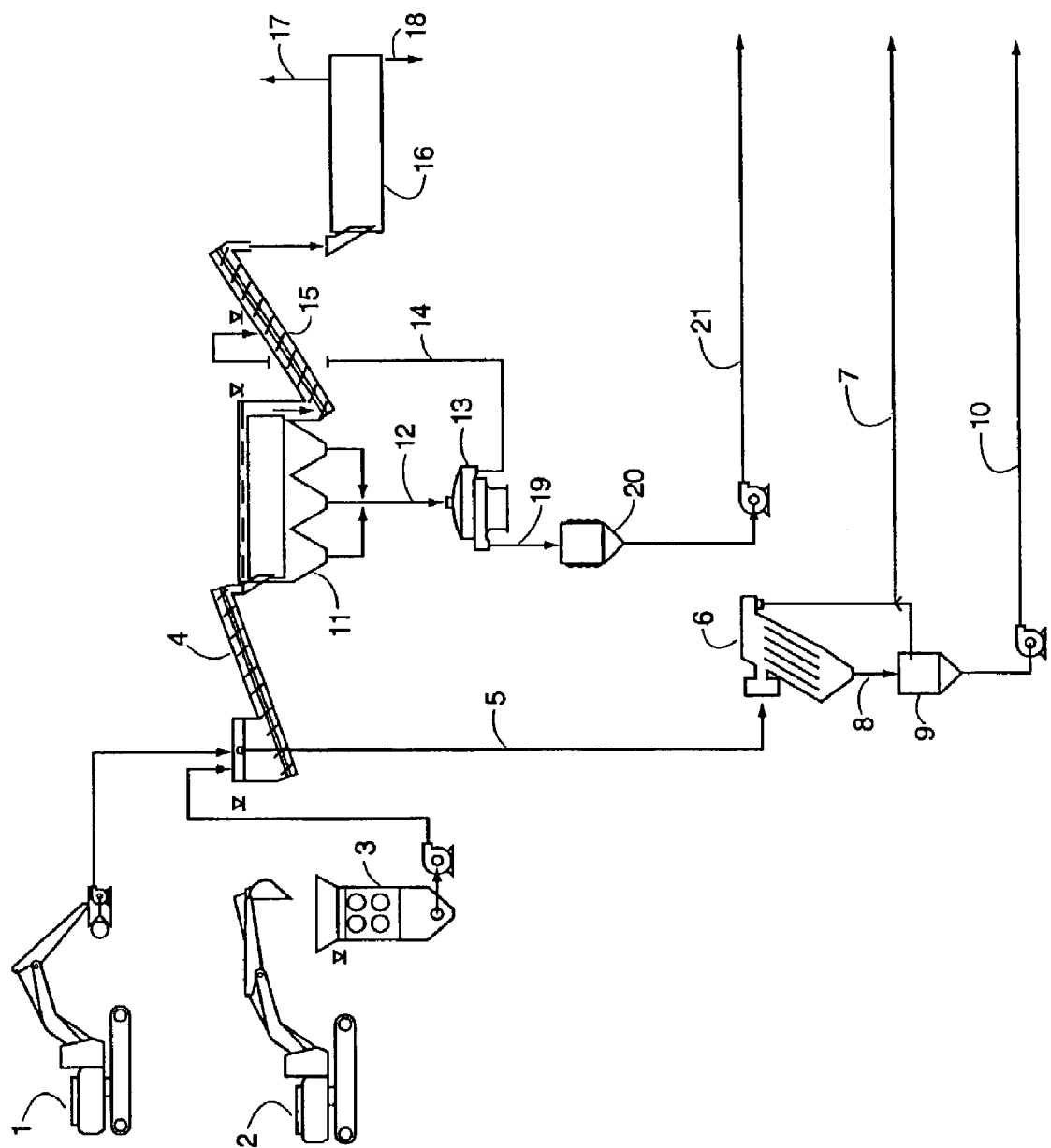

PROCESS FOR TOTAL ENVIRONMENTAL REMEDIATION OF A PHOSPHORUS CONTAMINATED SITE

CROSS REFERENCE TO RELATED APPLICATIONS

This application is related to application Ser. No. 09/371,284, filed Aug. 10, 1999 by Mohan Saran et al., titled, Recovery of Elemental Phosphorus from Phosphorus Sludge, now U.S. Pat. No. 6,451,276, issued Sep. 17, 2002, to U.S. Pat. No. 6,446,812, issued Sep. 10, 2002 to Charles Sturdivant et al., titled, Removal of Meltable Solids From Mixtures of Other Solids, and to application Ser. No. 09/859,254, filed May 17, 2001 by Mohan Saran, titled, Method of Removing Phosphorus From Sludge, now U.S. Pat. No. 6,620,396, issued Sep. 16, 2003.

BACKGROUND OF INVENTION

This invention relates to a method of recovering elemental phosphorus from phosphorus sludge and converting the residue into non-hazardous waste that can be disposed of safely. In particular, it relates to a process in which elemental phosphorus in sludge is separated from coarse solids by mechanical screening and melting, and is then separated from suspended solids using chromic acid. Coalesced phosphorus is recovered and the remaining solids are converted into non-hazardous compounds.

Elemental phosphorus is made commercially by heating nodulized phosphate rock mixed with sand and coke in an electric arc furnace. The phosphorus vapors are condensed in water and the liquid phosphorus is collected. A phosphorus sludge or mud consisting of elemental phosphorus, dirt, and water is an undesired byproduct of the process. The sludge is often deposited in ponds and covered with water to prevent the phosphorus from igniting. Since the sludge is considered to be hazardous, it must be rendered non-hazardous before it can be safely disposed of.

SUMMARY OF INVENTION

We have found a process that will convert sludge containing elemental phosphorus into a non-hazardous waste. The process of this invention involves various treatments of the waste that separate the elemental phosphorus from the remaining solids, coalesce and recover phosphorus particles, and convert non-recoverable elemental phosphorus and other constituents into non-hazardous compounds.

BRIEF DESCRIPTION OF DRAWINGS

The accompanying drawing is a flow diagram illustrating a certain presently preferred embodiment of the process of this invention.

DETAILED DESCRIPTION

The process of this invention is applicable to any sludge that contains about 0.5 to about 96 wt % elemental phosphorus (usually present as $P_4$), about 2 to about 80 wt % water, and about 2 to about 60 wt % dirt, which is typically a mixture of various solids such as carbon fines, slag (calciumsilicates), sand, and phosphate rock. The process of this invention is particularly applicable to sludges that contain about 5 to about 80 wt % elemental phosphorus, about 10 to about 45 wt % water, and about 10 to about 55 wt % solids.

While the sludge can be treated directly from an industrial process or after storage in a tank, it is typically treated after it has been stored under water in a pond. The pond may have been backfilled and covered with dirt or capped. Referring to the drawing, the sludge can be removed from the pond in a frozen state by, for example, using dredge 1, or backhoe 2 in conjunction with flooded-bed crusher 3, which pulverizes any large agglomerates to prevent them from clogging the lines. The sludge is placed in sand screw 4, which separates the coarse solids from the slurry of water and suspended solids. The slurry flows through line 5 to clarifier 6, where about 1 to about 50 ppm (parts per million, by weight) of a flocculent, such as a polymeric acrylic amide emulsion or a cationic polyacrylamide, may be added to settle the suspended solids. The preferred amount of flocculent is about 2 to about 20 ppm. The clarified water in line 7 is non-hazardous and can be returned to the pond. The solids from clarifier 6 consist primarily of many very finely divided dispersed or suspended particles of elemental phosphorus sludge and dirt. This material is passed through line 8 to thickener tank 9, where the solids settle.

The water in thickener tank 9 is sent to line 7 and the settled solids are pumped through line 10 to a tank (not shown) where they are heated to about 150Â° F. to melt the phosphorus. About 0.2 to about 2 wt % (preferably about 0.5 to about 1 wt %) of a coalescing agent such as sodium hexametaphosphate (SHMP), sodium pyrophosphate, sodium tripolyphosphate, or a mixture of these compounds is added to agglomerate the dispersed particles of $P_4$, which can then be recovered by centrifugation, filtration, or other means; SHMP is preferred as it has been found to work well. Treatment with a coalescing agent is more fully described in copending application Ser. No. 09/859,254, filed May 17, 2001, herein incorporated by reference.

Sand screw 4 empties solids into hot-water filled trommel screen 11, where coarse solids (i.e., larger than about ⅛ to 3/16 inches) are removed. These coarse solids typically contain small amounts of $P_4$. Trommel screen 11 is kept filled with hot water to melt phosphorus sludge. Molten phosphorus sludge and fine solids flow out the bottom of trommel screen 11 through line 12 to vibrating screen 13, which removes fine solids larger than about 30 mesh. These fine solids are sent through line 14 to secondary screw 15, where they are combined with the coarse solids passing through trommel screen 11. Secondary screw 15 empties the solids into rotary dryer 16, which heats the solids to about 204 to 260Â° C., burning any residual $P_4$ that is present to $P_2O_5$ (line17) which can be scrubbed in water to make phosphoric acid. The inert solids leave rotary dryer 16 through line 18. These inert solids are clean slag and other extraneous material used in pond construction and can be used as fill material or for other purposes.

The molten phosphorus sludge from vibrating screen 13 is sent through line 19 to holding tank 20, then through line 21 to a chromic acid plant (not shown). In the chromic acid plant, the molten sludge is heated to about 150Â° F. and stirred with a solution of chromic acid, which separates the elemental $P_4$ from the dirt. A 1 to 5 wt % chromic acid solution (based on the weight of the sludge) is preferred. The amount of chromic acid used should be about 0.5 to about 10 wt % of the amount of elemental phosphorus that is present in the sludge. Less chromic acid may not be effective and more is unnecessary; about 1 to about 3 wt % is preferred.

It is also usually necessary to add water to the sludge to help float the dirt away from the coalesced $P_4$ after treatment. Water can be added separately or it can be added with the chromic acid. The amount of water added should be about 75 to about 400 wt %, based on the weight of the sludge. While the water facilitates the removal of dirt from the sludge, too much water is unnecessary and provides no additional benefit. The preferred amount of water is about 90 to about 150 wt %.

The slurry is stirred just enough to liberate the dirt and produce a clean elemental phosphorus phase, but not so much that a phosphorus-in-water emulsion forms. Stirring to produce that result typically requires about 15 minutes to about 60 minutes at about 150 to about 300 rpm. Once the desired clean-up of phosphorus has been achieved, the stirring should be stopped as additional stirring may break the elemental phosphorus into tiny droplets and form a phosphorusemulsion, preventing the recovery of pure elemental phosphorus.

After the stirring is finished, the mixture is allowed to settle for at least 20 minutes to allow the phosphorus to form a separate phase. Instead of settling, the entire reaction mass can be filtered or centrifuged to recover the phosphorus, but settling is preferred because it makes it easier to handle the phosphorus phase. Any coarse dirt that is present (e.g., the minus-30 mesh sand-like material) settles to the bottom of the reactor. The next layer is elemental phosphorus, which has a density of about 1.7 g/cc. On top of the elemental phosphorus is the finer dirt, suspended in water. The various components of the slurry can now be separated. The resulting elemental phosphorus is typically about 90 to about 99 wt % pure and, if it is centrifuged or filtered, its purity can rise to 99.9 wt %. This phosphorus can be marketed as a product. A more detailed description of the chromic acid process can be found in U.S. Pat. No. 6,451,276 by Mohan Saran et al., herein incorporated by reference.

The aqueous portion of the slurry and the filter cakes from centrifugation and/or filtration can be mixed together. The $Cr^{6+}$ concentration of the mixture is measured. A solution containing about 3 to about 3.5 moles/mole $Cr^{6+}$ of a reducing agent is added to the reaction mixture to reduce the hazardous soluble $Cr^{+6}$ in the slurry to non-hazardous insoluble $Cr^{+3}$. Suitable reducing agents include ferrous sulfate, sodium sulfite, and hydrogen sulfide. Ferrous sulfate is preferred because it is easy to handle and gives a clean reaction.

Finally, the slurry is treated with about 2 to about 3 wt % (based on the weight of phosphorus) of an alkali, which reacts with the phosphorus in the reaction mixture to produce phosphorous compounds such as phosphine, phosphates, and hypophosphites. Suitable alkalis include lime, caustic soda, and soda ash; lime is preferred because it is inexpensive. The reaction mass can be filtered using a filter press and the filter cake can be placed in a landfill as non-hazardous waste.

The following example further illustrates this invention:

EXAMPLE

Frozen phosphorus sludge stored under water in a sludge pond was dredged below water level and pumped through an 8-inch line as a water-slurry to a sand screw at a rate of about 1,822 gallons per minute. The solids that settled out in the sand screw were conveyed to a rotating trommel screen that was filled with hot water maintained at a temperature of about 140 to 145° F.

Molten sludge flowed through the 3/16 inch screen openings in the trommel screen and was pumped on to a vibrating screen. Solids greater than 30 mesh size were retained on the screen and were combined with coarse solids from the trommel screen and dried in a rotary dryer at a temperature of about 400 to 460° F. to burn off any residual phosphorus. The amount of phosphorus in solids going into the dryer was generally less than 1 wt % and was less than 25 ppm as the solids came out of the dryer.

Molten sludge passing through the 30-mesh vibrating screen was pumped to a holding tank for further processing with chromic acid. During 4.7 hours of dredge operation, 20 tons of dry solids and 4,761 gallons of molten sludge were produced.

Water overflow from the sand screw contained suspended solids ($P_4$=0.25 wt %; dirt=0.7 wt %) and was pumped to a clarifier where it was mixed with 10 ppm of AF-4064, a cationic polyacrylamide sold by Pook Chemicals, to settle the suspended particles. The clarified water stream (now $P_4$=54 ppm; dirt=600 ppm) was pumped back to the pond. The settled solids had phosphorus content of 0.7 wt % and contained 5.4 wt % dirt.

The settled solids, after further dewatering on storage, were mixed with 1 wt % of sodium hexametaphosphate (based on the weight of the phosphorus). The mixture was stirred for 30 minutes at 150° F. After centrifugation, 55 to 65 wt % of the phosphorus present in the solids was recovered. The filter cake was discharged to a wastewater-holding tank for further processing.

Molten sludge (1,527 gallons) was pumped to a chromic acid reactor and was mixed with 2,473 gallons of hot water to give a temperature of 119° F. The reactor was charged 166 gallons of 50 wt % chromic acid solution and the contents were stirred for 45 minutes at a stirring rate of 160 rpm. The final reaction temperature was 170° F. At the end of the stirring period, the reactor contents were transferred to a settler and were allowed to settle for 25 minutes. A settled separated phosphorus layer measuring about 400 gallons was obtained. Both the phosphorus and the aqueous layers were sampled and analyzed. The phosphorus layer contained 0.2 wt % xylene insolubles and the aqueous layer contained 10.6 wt % dirt and less than 0.1 wt % phosphorus. The phosphorus layer was separated from the aqueous layer and was centrifuged to give pale yellow-colored phosphorus of greater than 99.9 wt % purity.

The aqueous layer from the settler was transferred to the wastewater-holding tank. The filter cake from the centrifuge was also discharged to the same wastewater-holding tank. A 4,000 gallon stirred aqueous sample from this tank was transferred to a wastewater treatment tank and heated to a temperature of about 170° F. This water sample had the following analysis:

Phosphorus=0.2 wt %

Dirt=10.4 wt %

Chromium (+6)=146 ppm

One hundred pounds of ferrous sulfate heptahydrate were added to the stirred water to reduce chromium (+6) to chromium (+3). The level of chromium (+6) was reduced to less than 0.02 ppm. Elemental phosphorus was hydrolyzed by the addition of 700 gallons of 20 wt % lime slurry. The phosphine gas, which was liberated, was oxidized to phosphorus pentoxide in a phosphine burner. The hydrolyzed water batch was filtered using a filter press. The clear filtrate was returned to the pond. About 5 tons of filter cake, which was found to be non-hazardous by the TCLP method, was placed in a secure landfill.

What is claimed is:

1. A process for recovering phosphorus from an aqueous sludge that contains elemental phosphorus and rendering the residue non-hazardous comprising
    (A) separating said sludge into
        (1) a slurry of water containing suspended phosphorus and dirt particles; and
        (2) coarse solids;
    (B) adding a flocculating agent to said slurry to settle said suspended phosphorus and dirt particles;
    (C) recovering said settled phosphorus and dirt particles from said water;
    (D) heating said recovered phosphorus and dirt particles to melt elemental phosphorus therein;
    (E) adding a coalescing agent to said heated phosphorus and dirt particles to coalesce said melted phosphorus particles;
    (F) separating said melted elemental phosphorus from said dirt particles;
    (G) mixing said coarse solids from step (A) with hot water to melt phosphorus sludge therein;
    (H) separating melted phosphorus sludge from coarse inert solids;
    (I) reacting said melted phosphorus sludge with chromic acid, whereby elemental phosphorus therein separates from water and solids and forms a separate phase;
    (J) recovering said separated elemental phosphorus phase;
    (K) adding reducing agent to said water and solids from step (I) to reduce $Cr^{+6}$ to $Cr^{+3}$; and
    (L) adding alkali to said water and solids from step (K) to convert any residual elemental phosphorus into compounds of phosphorus.

2. A process according to claim 1 wherein said sludge comprises about 0.5 to about 96 wt % elemental phosphorus, about 2 to about 80 wt % water, and about 2 to about 60 wt % dirt.

3. A process according to claim 1 wherein said sludge is a byproduct from the production of elemental phosphorus in an electric furnace.

4. A process according to claim 1 wherein said sludge is removed in a frozen state from a pond using a dredge.

5. A process according to claim 1 wherein said sludge is removed in a frozen state from a pond using a backhoe and large agglomerates therein are crushed prior to step (A).

6. A process according to claim 1 wherein said coalescing agent is sodium hexametaphosphate.

7. A process according to claim 1 wherein said reducing agent is ferrous sulfate.

8. A process according to claim 1 wherein said alkali is lime.

9. A process according to claim 1 wherein said flocculating agent is a cationic polyacrylamide.

10. A process for converting an aqueous sludge that contains about 0.5 to about 96 wt % elemental phosphorus into non-hazardous waste comprising
    (A) separating a slurry containing suspended phosphorus sludge and dirt particles from coarse solids in said sludge;
    (B) adding about 1 to about 50 ppm of a flocculent to said slurry to clarify water in said slurry;
    (C) separating said clarified water from the remaining slurry;
    (D) heating said remaining slurry to melt elemental phosphorus therein;
    (E) adding about 0.2 to about 2 wt % of a coalescing agent to said remaining slurry to agglomerate said elemental phosphorus particles therein;
    (F) recovering said settled elemental phosphorus from said remaining slurry by centrifugation or filtration;
    (G) mixing said coarse solids from step (A) with hot water, whereby phosphorus sludge in said coarse solids melts;
    (H) separating said melted phosphorus sludge from inert solids;
    (I) burning residual elemental phosphorus in said inert solids;
    (J) stirring about 0.5 to about 10 wt % chromic acid and about 75 to about 400 wt % water into said melted phosphorus sludge, whereby elemental phosphorus forms a separate phase from said water and suspended solids;
    (K) recovering said separated elemental phosphorus phase;
    (L) adding about 3 to about 3.5 moles of reducing agent per mole of $Cr^{+6}$ to said water and suspended solids to reduce $Cr^{+6}$ to $Cr^{+3}$; and
    (M) adding about 2 to about 3 wt % alkali, based on the weight of elemental phosphorus present, to said water and suspended solids, which reacts with said elemental phosphorus to form compounds of phosphorus.

11. A process according to claim 10 wherein said coalescing agent is sodium hexametaphosphate.

12. A process according to claim 10 wherein said flocculent is a cationic polyacrylamide.

13. A process according to claim 10 wherein said reducing agent is ferrous sulfate.

14. A process according to claim 10 wherein said alkali is lime.

15. A process according to claim 10 wherein said stirring is for about 15 to about 60 minutes at about 150 to about 300 rpm.

16. A process for converting a sludge that comprises water, solids, and about 5 to about 80 wt % elemental phosphorus into non-hazardous waste comprising
    (A) separating a slurry containing suspended phosphorus sludge and dirt particles from coarse solids in said sludge;
    (B) adding about 2 to about 20 ppm of a flocculent to said slurry to clarify water in said slurry;
    (C) separating said clarified water from the remaining slurry;
    (D) heating said slurry to melt elemental phosphorus particles therein;
    (E) adding about 0.5 to about 1 wt % of a coalescing agent to said slurry to agglomerate said elemental phosphorus particles therein;
    (F) recovering said agglomerated elemental phosphorus particles from said slurry;
    (G) mixing said coarse solids from step (A) with hot water, whereby phosphorus sludge therein melts;
    (H) separating said melted phosphorus sludge from inert solids;
    (I) stirring about 1 to about 3 wt % chromic acid and about 90 to about 150 wt % water into said melted elemental phosphorus, water, and suspended solids, whereby an elemental phosphorus phase separates from said water and suspended solids;
    (J) recovering said separate elemental phosphorus phase;
    (K) adding about 3 to about 3.5 moles of ferrous sulfate per mole of $Cr^{+6}$ to said water and suspended solids to reduce $Cr^{+6}$ to $Cr^{+3}$; and
    (L) adding about 2 to about 3 wt % lime, based on phosphorus weight, to said suspended solids to convert elemental phosphorus into compounds of phosphorus.

17. A process according to claim 16 wherein said heating is to about 150° F.

18. A process according to claim 16 wherein said flocculent is a cationic polyacrylamide.

19. A process according to claim 16 wherein said coalescing agent is sodium hexametaphosphate.

20. A process according to claim 16 wherein said stirring is for about 15 to about 60 minutes at about 150 to about 300 rpm.

* * * * *